Patented Aug. 14, 1928.

1,680,844

UNITED STATES PATENT OFFICE.

FREDERICK M. BECKET, OF NEW YORK, N. Y., ASSIGNOR TO ELECTRO METALLURGICAL COMPANY, OF NEW YORK, N. Y., A CORPORATION OF WEST VIRGINIA.

WELDING OF COPPER AND COPPER ALLOYS.

No Drawing.  Application filed February 21, 1922.  Serial No. 538,364.

This invention relates to the welding and brazing of copper and copper alloys and has for its object the improvement of joints of this character.

This object is attained by using in the welding or brazing operation compositions which are novel for this purpose, as more fully described below.

Pure copper is not well adapted for use in welding, as copper is very readily oxidized when in the molten condition. the oxide formed distributing itself through the fused metal and seriously detracting from the strength and toughness of the solid metal formed on cooling. For this reason, phosphorus is commonly added to copper to be used for welding to serve as a deoxidizer and thus render the added metal stronger and tougher.

Copper and copper alloys are also often oined with molten bronzes containing copper and zinc with or without tin or other metals. This operation is brazing rather than welding, as the surfaces to be joined are only superficially merged with the joining metal. When bronzes are melted for brazing, offensive fumes are produced, and the health of the operator may be adversely affected.

I have discovered that a weld which is in many respects superior to those obtainable with phosphor-copper, may be produced by the use of certain copper-silicon alloys as the added metal. Oxidation of the copper is prevented and enough silicon remains in the metal to increase its tensile strength considerably, in addition to imparting other desirable properties, as hereinafter more fully disclosed.

While lower silicon contents are not precluded, such tests as I have made indicate that the silicon should be above about 1.25%. An improvement in operation and results is noted when the silicon is still further increased to the range extending from about 2.0% to about 4.0%, excellent welds being obtained with rods having compositions within that range. The range between 2.75% and 3.25% is preferred for general use.

With silicon above about 4%, the melting point of the alloy becomes so low that it is not adapted for ordinary welding operations, as the added metal tends to run out of the weld before the surfaces to be joined can be heated sufficiently to permit a bond of maximum effectiveness. However, silicon contents up to 5.38% have been tested and are useful for certain purposes, for example filling up blow-holes in castings, where a very fluid filling material is desirable and the great strength of the joint between the added metal and the metal operated on is not essential.

Comparison between welds made with phosphor-copper and those made with silicon-copper show that deoxidation is more complete in the latter case. Most of the silicon remains in the weld regardless of whether the original silicon content was high or low, as is shown by the following figures:

|  | Per cent silicon | |
|---|---|---|
|  | Before puddling | After puddling |
| Specimen 1 | 2.20 | 2.14 |
| " 2 | 3.92 | 3.69 |
| " 3 | 5.38 | 5.21 |

The figures give the silicon content of compositions in accordance with my invention before and after these compositions were subjected to a fusion and puddling operation designed to permit at least as much oxidation as would occur in actual welding. These tests were carried out without permitting the admixture of fused adjacent metal, such as would occur in welding, as such admixture would, of course, dilute the added material and thereby indicate a lower silicon content. The loss in silicon during the test and hence during welding, though small, is quite sufficient to account for the reduction of such copper oxide as could be formed during the operation.

Because of the more effective deoxidation and the silicon content of the added metal, the welded joint shows a decided increase in tensile strength over that obtainable with phosphor-copper, while the resistance to fracture by bending is also increased. Welds made with silicon-copper show excellent physical properties at elevated temperatures, for example those to which they are subjected when in contact with superheated steam.

The presence in the welding composition of elements other than copper and silicon is not precluded, and may be useful under some circumstances.

The term "welding rod" as used in the appended claims imports a member intended to be used in connection with the blow-torch or electric arc for the deposition of molten metal at any desired point, and is not limited to a member of any particular shape or dimensions.

I claim:

1. A welding rod consisting predominantly of copper and silicon, the silicon being present in amount between 1.25% and 4%.

2. A welding rod consisting predominantly of copper and silicon, the silicon being present in amount between 2% and 4%.

3. A welding rod consisting predominantly of copper and silicon, the silicon comprising about 3% of the rod.

4. A metal article comprising a fusion weld, the metal within the weld containing 1.25% to 4% silicon, and consisting predominantly of copper and silicon.

5. A metal article comprising a fusion weld, the metal within the weld containing 2% to 4% silicon, and consisting predominantly of copper and silicon.

In testimony whereof, I affix my signature.

FREDERICK M. BECKET.